Figure 4:
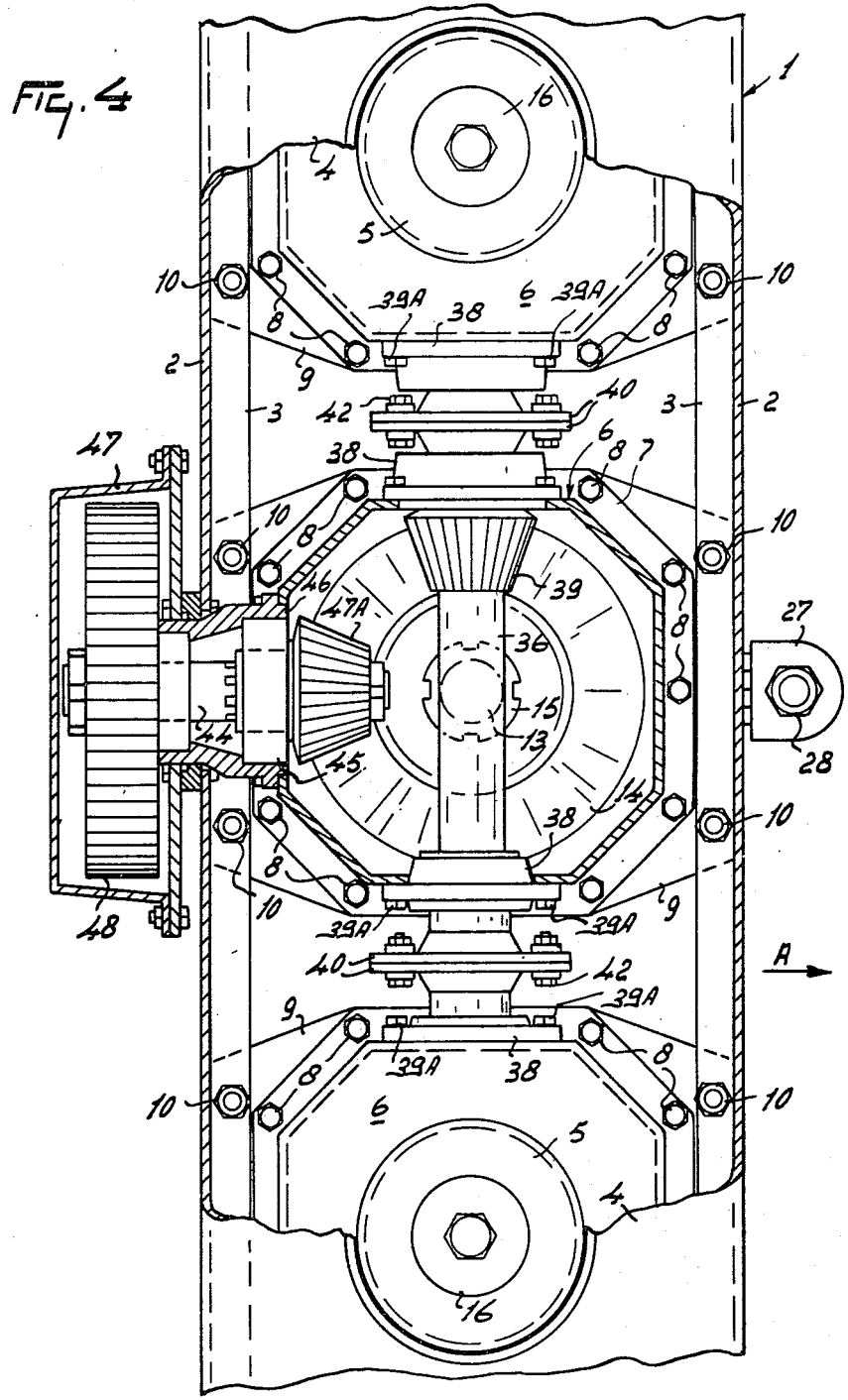

United States Patent [19]

van der Lely

[11] 4,298,069

[45] Nov. 3, 1981

[54] SOIL CULTIVATING IMPLEMENTS

[76] Inventor: Cornelis van der Lely, 7, Brüschenrain, Zug, Switzerland

[21] Appl. No.: 73,862

[22] Filed: Sep. 10, 1979

[30] Foreign Application Priority Data

Sep. 11, 1978 [NL] Netherlands .......................... 7809222
Sep. 11, 1978 [NL] Netherlands .......................... 7809223

[51] Int. Cl.³ ........................ A01B 33/06; A01B 33/14
[52] U.S. Cl. ..................................... 172/59; 172/103; 172/125
[58] Field of Search .................... 172/49, 59, 125, 103, 172/117, 49.5

[56] References Cited

U.S. PATENT DOCUMENTS

| | | | |
|---|---|---|---|
| 2,050,120 | 8/1936 | Pizarro | 172/59 |
| 2,741,173 | 4/1956 | White | 172/59 |
| 3,059,704 | 10/1962 | Kasatkin | 172/125 |
| 3,074,490 | 1/1963 | Burns | 172/125 X |
| 3,367,425 | 2/1968 | Heeren | 172/59 |
| 3,616,862 | 11/1971 | Lely | 172/59 |
| 4,042,039 | 8/1977 | Lely | 172/59 |
| 4,043,401 | 8/1977 | Lely | 172/59 |
| 4,072,196 | 2/1978 | Lely | 172/59 |
| 4,098,345 | 7/1978 | Lely | 172/103 |
| 4,111,264 | 9/1978 | Lely | 172/59 |
| 4,130,167 | 12/1978 | Lely | 172/59 |
| 4,148,364 | 4/1979 | Gross-Scharmann | 172/117 |

Primary Examiner—Richard J. Johnson
Attorney, Agent, or Firm—William B. Mason

[57] ABSTRACT

A soil cultivating implement has a frame portion of inverted channel-shaped cross-section with downwardly directed limbs each of which has an inwardly bent-over lip at its lower free end. A row of contrarotating soil working members are carried by corresponding substantially vertical shafts. A power-operated drive transmission to the soil working members comprises the aforesaid vertical shafts, axially aligned, substantially horizontal shafts and intermeshing bevel pinions. In order to facilitate assembly as well as quick and simple replacement of any soil working member and/or transmission part that may become seriously worn, broken or damaged during operation, the transmission is made up of a plurality of successively neighboring gear casings any one of which can be individually removed, together with the corresponding soil working member and replaced by a similar unit. The successive, substantially horizontal shafts are drivingly interconnected by abutting coupling flanges releasably secured to one another by shear bolts. The shear bolts are readily accessible through holes in the uppermost web or base of the frame portion and each gear casing is secured to a corresponding supporting plate which, in turn, is releasably fastened by bolts to the inwardly directed lips at the lower ends of the frame portion limbs. Each member can be formed by a resilient carrier on a shaft and in one embodiment the drive to the members can be via a gear containing cassette in which the member shafts are splined to respective gears. Also, a spray boom can be secured in front of the members, beneath the frame portion.

11 Claims, 7 Drawing Figures

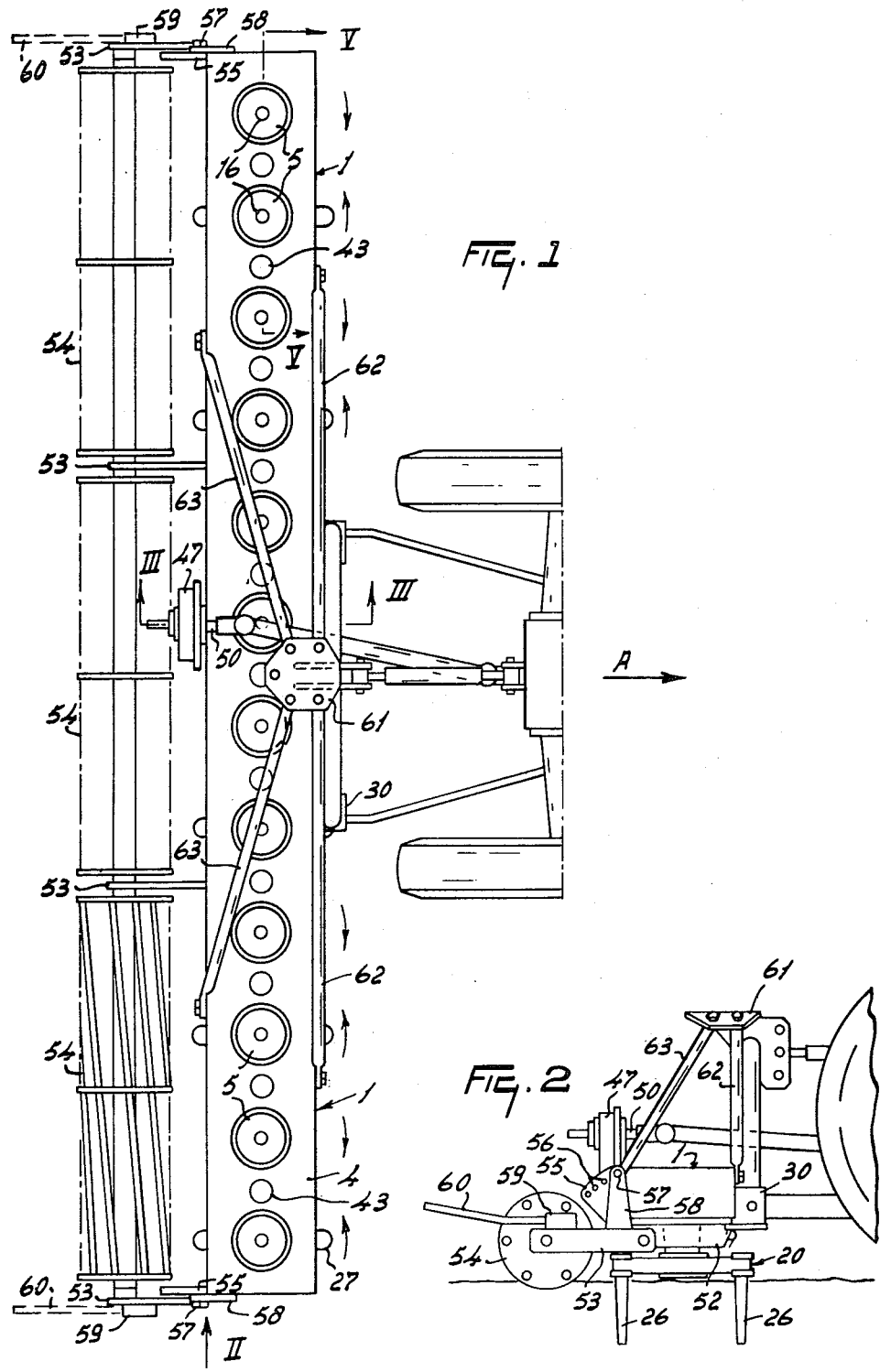

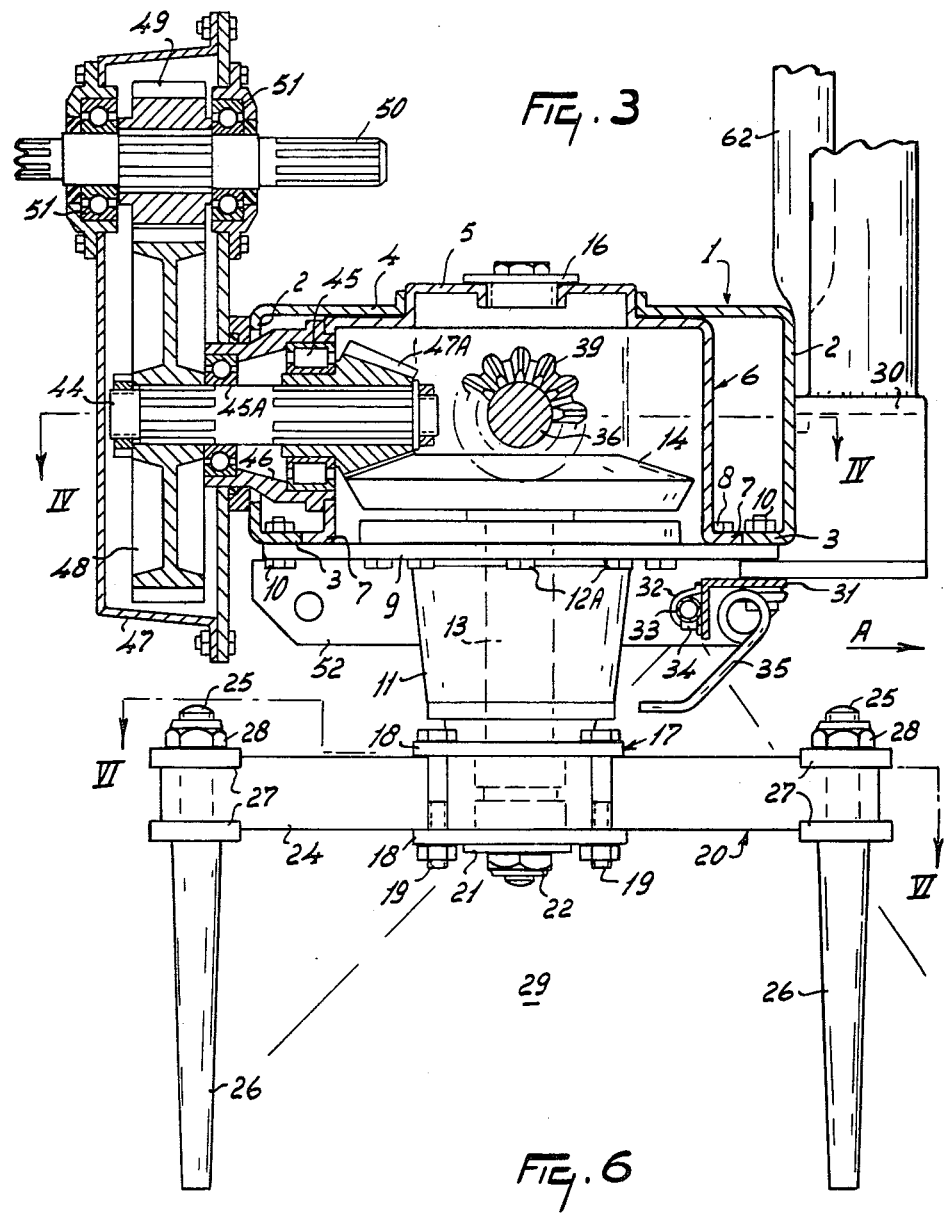

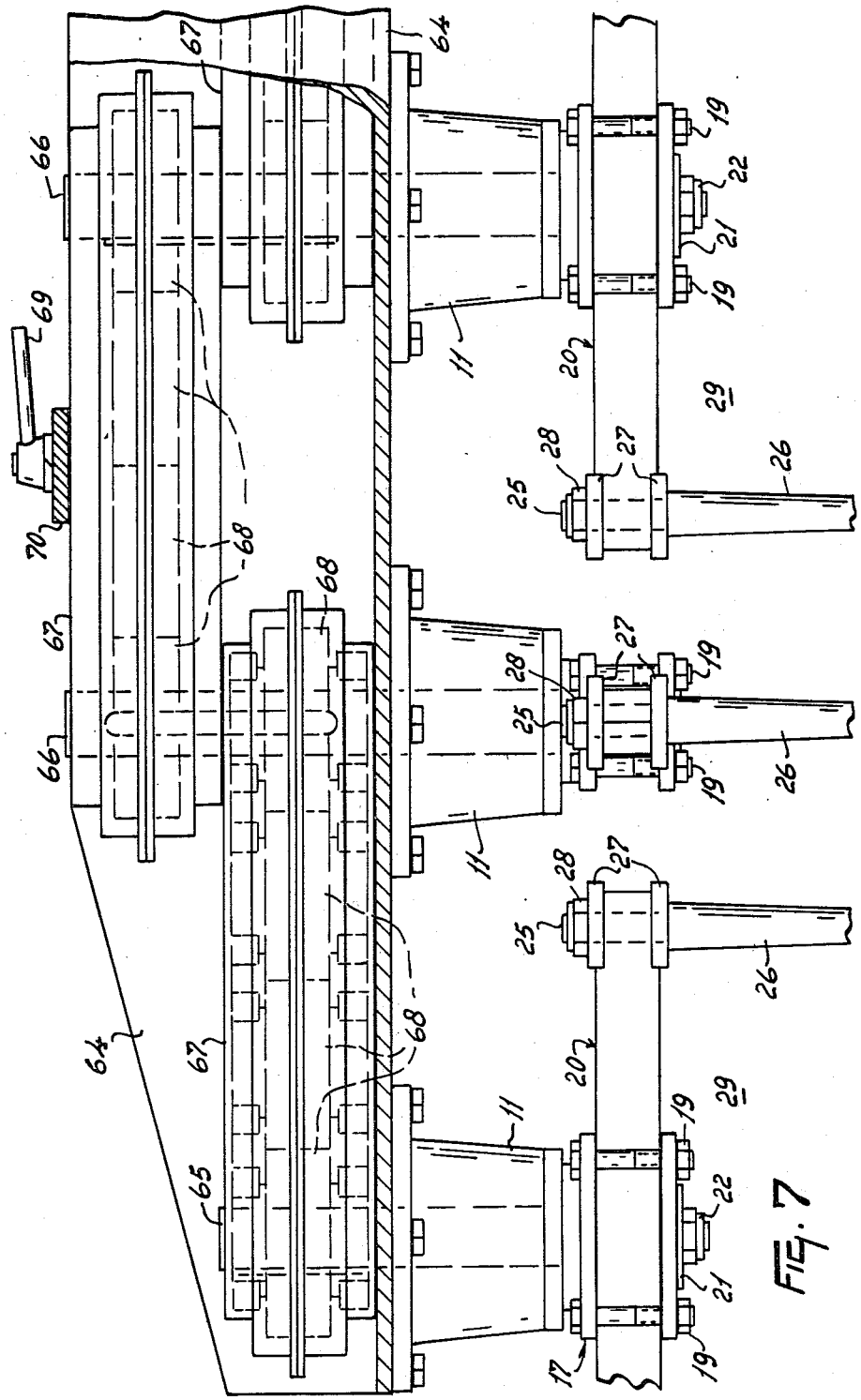

SOIL CULTIVATING IMPLEMENTS

This invention relates to soil cultivating implements or machines of the kind which comprise a mobile frame portion supporting a plurality of soil working members that are rotatable about nonhorizontal axes by a power-driven transmission of which at least part is contained in a gear casing that may be afforded by said frame portion. The term "implement(s) or machine(s)" will be shortened to "implement(s)" alone throughout the remainder of this specification of the sake of brevity.

The drive transmissions in known implements of the kind set forth are required to rotate the soil working members thereof against strong opposing forces so that, however well made the transmission parts may originally be, there is a considerable risk of their becoming worn, damaged or broken during operation. Since such parts are not readily replaceable, a breakdown can be very inconvenient because it often cannot be remedied without a major repair job of lengthy duration. Moreover, the initial factory assembly of such known implements is an operation which takes a considerable period of time. The present invention seeks, in one aspect thereof, to overcome or very significantly to reduce these shortcomings and accordingly provides a soil cultivating implement of the kind set forth, wherein at least parts of said drive transmission are housed in a plurality of unitary gear casings which are each separate from said frame portion, the unitary gear casings being separately removable from and replaceable in said frame portion together with the corresponding transmission parts.

Figure 5:
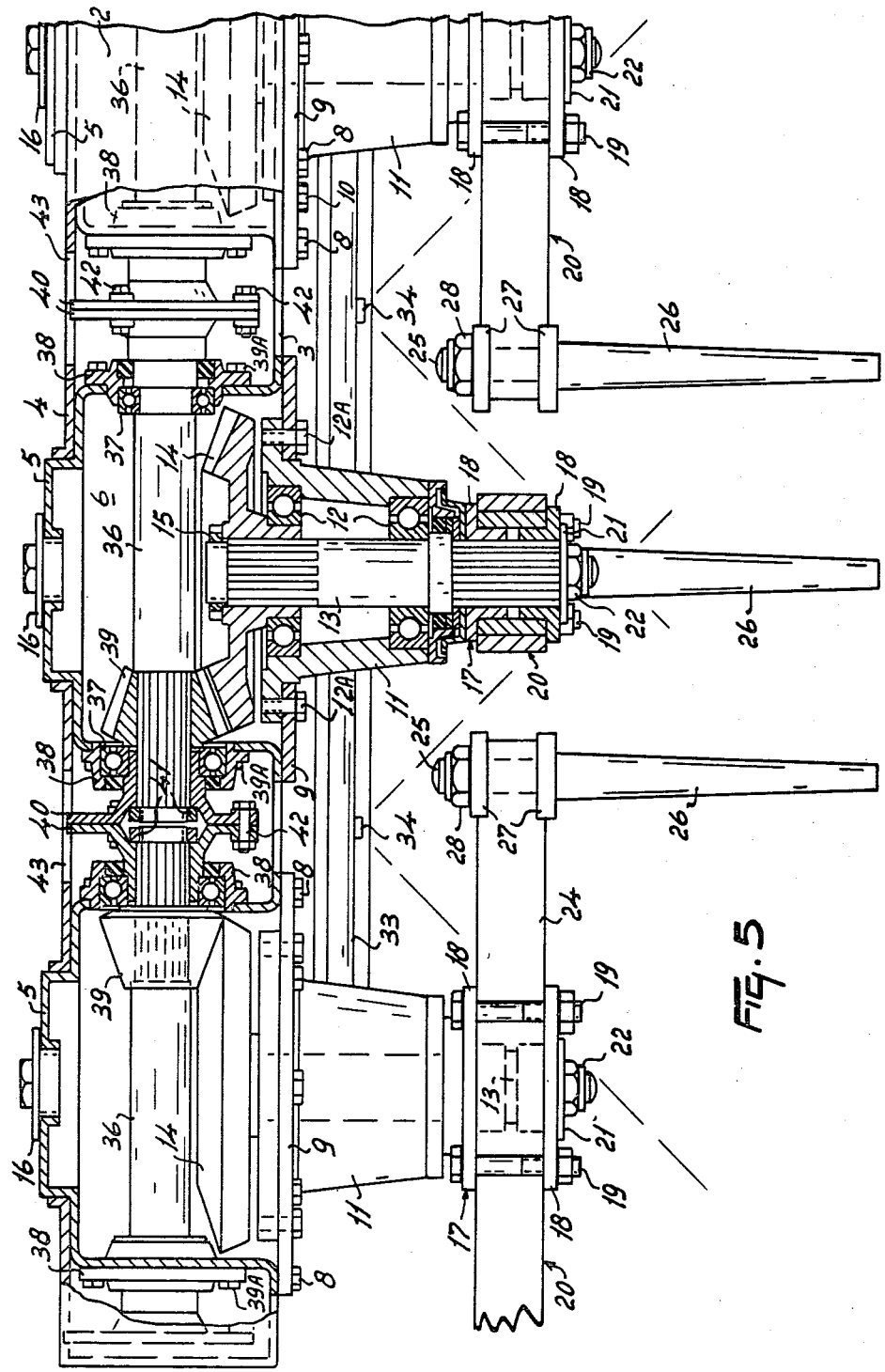

For a better understanding of the invention, and to show how the same may be carried into effect, reference will now be made, by way of example, to the accompanying drawings, in which:

FIG. 1 is a plan view of a soil cultivating implement in accordance with the invention shown connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a section taken on the line IV—IV in FIG. 3, FIG. 5 is a section, to an enlarged scale, taken on the line V—V in FIG. 1, FIG. 6 is a section taken on the line VI—VI in FIG. 3, and FIG. 7 is a part-sectional elevation taken upon a line substantially corresponding to the line V—V of FIG. 1 but illustrating an alternative form of soil cultivating implement in accordance with the invention.

Referring to FIGS. 1 to 6 of the accompanying drawings, the soil cultivating implement that is illustrated therein comprises a sheet metal frame portion 1 that extends substantially horizontally transverse, and usually, as illustrated, substantially horizontally perpendicular, to the intended direction of operative travel of the implement that is indicated in FIGS. 1, 3 and 4 of the drawings by an arrow A. The sheet metal of the frame portion 1 is bent in such a way as to give that frame portion an inverted channel-shaped cross-section. This shape can be seen best in FIG. 3 of the drawings from which it will be evident that the two limbs 2 of said cross-section project substantially vertically downwards away from the uppermost base 4 thereof. The two limbs 2 are bent over inwardly towards one another through substantially 90° at their lowermost edges to form corresponding lips 3. The uppermost base 4 of the inverted channel-shaped cross-section frame portion 1 is formed at regular intervals along its length with circular holes whose centers are spaced apart from one another by distances of exactly, or substantially 36½ centimeters. Each circular hole has a perpendicularly bent-over, and upwardly projecting, rim (see FIG. 3) in which fits, from beneath, a corresponding circular shaped upward projection 5 of a respective gear casing 6, each gear casing 6 being formed from steel sheet by a deep-drawing process. It can also be seen in FIG. 3 of the drawings that the top of each gear casing 6, around the upward projection 5 of that casing, abuts against the lower surface of the base 4 of the frame portion 1 throughout a considerable contact area.

The bottom of each gear casing 6 is of polygonal shape which shape is conveniently the octagonal one which can be seen in FIG. 4 of the drawings, said bottom having a perpendicularly outwardly projecting rim 7 which is releasably secured by a plurality of small bolts 8 to a respective supporting plate 9 that closes the bottom of the casing 6 concerned and that has front and rear fastening portions which are releasably secured to the front and rear lips 3 of the frame portion 1 by larger bolts 10. Each supporting plate 9 has a central circular opening which is substantially vertically in register with one of the circular holes in the uppermost base 4 of the frame portion 1 and each such supporting plate opening receives a bearing housing 11 that projects downwardly from beneath the plate 9 concerned but whose upper end is provided with a flange that is releasably secured to the margins of the opening in the plate 9 by a plurality of bolts 12A. Each bearing housing 11 internally accommodates a pair of substantially vertically aligned and axially spaced apart ball bearings 12 and each pair of ball bearings 12 rotatably carries a corresponding non-horizontal shaft 13 which will usually, as illustrated, be vertically or substantially vertically disposed. The upper end of each shaft 13 is splined and carries the matching internally splined hub of a respective bevel pinion 14 which is thus located inside the gear casing 6 concerned. The upper extremity of each shaft 13 comprises a short screwthreaded part of reduced diameter and said part co-operates with a nut 15 which acts to prevent axial disengagement of the bevel pinion 14 from the shaft 13.

The center of the upward projection 5 at the top of each gear casing 6 is formed with a screwthreaded hole that receives a respective flanged plug 16. The flanged plugs 16 can readily be removed and reinstalled by using a spanner or wrench and, when one of said plugs 16 is removed, oil or other lubricant can be inserted into the interior of the gear casing 6 concerned through the open hole with which the removed plug 16 cooperates. Each shaft 13 projects downwardly beyond the lowermost end of the corresponding bearing housing 11, the downwardly projecting portion being splined for the reception of upper and lower sleeve 17, the upper sleeve 17 having an oblong (see FIG. 6) flange 18 at its upper end and the lower sleeve 17 having a similar oblong flange 18 at its lower end. The four corners of the upper and lower flanges 18 of each pair are formed with holes and clamping bolts 19 are entered through the aligned holes to draw the flanges 18 into clamping engagement with the intervening carrier 20 of a corresponding soil working member which is generally indicated by the reference 29. Each pair of sleeves 17, together with the corresponding soil working member 29, is prevented from becoming axially detached from the downwardly projecting portion of the corresponding shaft 13 by forming the lowermost extremity of that shaft 13 as a short screwthreaded part of reduced diameter and providing a co-operating retaining washer 21 and co-operating nut 22. The retaining nut 22 may be provided with any known means, such as a split pin (not shown), to prevent it from working loose during the operation of the implement.

Each carrier 20 comprises an inner pair of spring steel strips 23 which are arranged symmetrically at opposite sides of the corresponding shaft 13 and which are formed, midway along their lengths, with opposed substantially semi-circular deformations which deformations embrace the corresponding sleeves 19 (see FIGS. 3 and 6). Those parts of the strips 23 which lie beyond the substantially semi-circular deformations abut against one another throughout their lengths. Each carrier 20 also comprises an outer pair of spring steel strips 24 which are similar to the strips 23 except that they are somewhat greater in length. The strips 24 abut against the outer surfaces of the strips 23 throughout the lengths of the latter but it will be seen from the right-hand side of FIG. 6 of the drawings that each strip 24 is a little greater in length than is each strip 23, the ends of the strips 24 that project beyond the ends of the strips 23 being arcuately bent over towards one another to form spaces at the opposite ends of each carrier 20 for the reception of a fastening portion 25 of a corresponding rigid soil working tine 26. At least the upper end of each tine fastening portion 25 is screwthreaded and receives a retaining nut 28 which nut may advantageously be of a known kind which includes a plastics or other insert designed to prevent the nut from working loose once it has been tightened. Upper and lower substantially semi-circular clamping plates 27 which have rims that engage upper and lower edge regions of the outer spring steel strips 24 co-operate with those strips 24, with the tine fastening portions 25 and with the nuts 28 in the manner which can be seen in FIGS. 3 and 6 of the drawings in connecting the tines 26 firmly and reliably to the opposite ends of each substantially horizontally disposed carrier 20. The implement which is being described by way of example with reference to FIGS. 1 to 6 of the drawings has twelve of the soil working members 29 but it will, of course, be appreciated that greater or lesser numbers of these soil working members 29 could equally well be furnished. Each soil working member 29 comprises one of the carriers 20 and a pair of the tines 26.

Two brackets 30 are provided at the front of the frame portion 1, with respect to the direction A, and at substantially the bottom of that frame portion, the pair of brackets 30 being located midway across the working width of the soil cultivating implement. The bottom of the brackets 30 have one substantially horizontally disposed limb of a bar 31 of L-shaped cross-section secured to them by appropriately disposed ones of the leading bolts 10. The other limb of the bar 31 projects downwardly towards the ground surface from the rear edge of the substantially horizontally disposed limb and has a tubular spray boom 33 secured to it by a number of clips 32. The boom 33 extends substantially horizontally perpendicular to the direction A and comprises a row of regularly spaced apart spray nozzles or heads 34 all of which are downwardly directed to produce spray patterns such as those which are shown in broken lines in FIGS. 3 and 5 of the drawings. The boom 33 communicates by way of at least one conduit which is not shown in the drawings with a tank (also not shown) that may be mounted on the frame portion 1 of the implement or, alternatively, on a tractor or other vehicle which both moves and operates the implement when the latter is in operation. The substantially horizontally disposed limb of the bar 31 is provided with a row of resilient tines 35 which tines are conveniently, but not essentially, formed in integral pairs. Each tine 35 comprises a fastening portion which may be secured in position by one of the aforementioned leading bolts 10, a resilient loop which comprises at least one complete 360° turn and a straight portion which is directed downwardly and rearwardly, with respect to the direction A, away from said loop at an angle of substantially 45° to both the horizontal and the vertical. The substantially straight portion which has just been mentioned is bent over at its lowermost and rearmost end to form a further but shorter straight portion which is horizontally or substantially horizontally disposed beneath the nozzles or heads 34 at substantially the level of the bottoms of the bearing housings 11, the free ends of the substantially horizontal straight portions of the tines 35 being located in close proximity to the bottoms of respective ones of said housings 11.

The opposite lateral (with respect to the direction A) sides of each gear casing 6 have the opposite ends of corresponding shafts 36 projecting from them, said shafts 36 extending substantially horizontally parallel to the length of the hollow frame portion 1 in substantially axially coincident relationship with one another. Each shaft 36 is rotatably supported by substantially horizontally aligned ball bearings 37 which are carried by bearing housings 38 that are secured to the opposite upright side walls of the gear casing 6 concerned by bolts 39A, the bearing housing 38 being lodged in respective openings in said side walls. Each shaft 36 is provided, inside the corresponding gear casing 6, with a bevel pinion 39 whose teeth are in driving mesh with those of the larger bevel pinion 14 that is carried at the upper end of the corresponding shaft 13. The pinions 39 are so positioned on the successive shafts 36 that each soil working member 29 will, when the implement is in use, revolve in the opposite direction to the or each of its immediate neighbours. The ends of the shafts 36 that project from the lateral sides of the gear casings 6 are splined and each such end receives the matchingly splined hub of a coupling flange 40. The opposite extremities of each shaft 36 are screwthreaded and receive corresponding fastening nuts 41 which nuts, when tightened, reliably retain the bevel pinions 39, the ball bearings 37 and the coupling flanges 40 in their appointed axial positions on the shafts 36.

It is evident from the drawings, and particularly from FIG. 5 thereof, that the gear casings 6 are releasably retained in the frame portion 1, the coupling flanges 40 that correspond to the successive gear casings 6 abutting against one another and being drivingly interconnected by at least two, and conveniently three, bolts 42 which bolts are advantageously shear bolts. Holes 43 are formed in the uppermost base 4 of the frame portion 1 at locations which register with the pairs of interconnected flanges 40 and it can be seen in FIG. 5 of the drawings that access can readily be obtained to the bolts 42 for tightening and releasing purposes by way of the holes 43 and/or by way of the openings which are left between the successive supporting plates 9 at the bottom of the frame portion 1.

One of the center pair of gear casings 6 in the row of twelve, in this embodiment, has an opening in its rear wall in which a shaft 44 (FIG. 3) is mounted so as to be rotatable about a substantially horizontal axis that is parallel or substantially parallel to the direction A. A bearing housing 46 is mounted in said opening and carries substantially horizontally aligned but axially spaced apart rotary bearings 45 and 45A, the bearing 45A being a ball bearing while the diagrammatically illustrated bearing 45 may be a roller bearing or a plain bearing. The leading inner end of the shaft 44 is splined and co-operates with the internal splines of the hub of a bevel pinion 47A which is conveniently identical to the previously mentioned bevel pinions 39. The bevel pinion 47A has its teeth in driving mesh with those of the bevel pinion 14 that corresponds to the gear casing 6 under consideration and it will be realised that, when the bevel pinion 47A transmits drive to said pinion 14, that pinion will, in turn, drive the axially coincident shafts 36 and all of the other soil working members 29 by way of the pinion 39 which is in driven mesh with said pinion 14. The rearmost end of the shaft 44, with respect to the direction A, is also splined and projects from the back of the corresponding gear casing 6 into a further gear casing 47, the rear splined portion of said shaft 44 carrying, inside the further gear casing 47, a straight-toothed or spur-toothed pinion 48 whose internally splined hub co-operates with the splines on the shaft 44. The top of the further gear casing 47 has a substantially horizontal shaft 50, that extends parallel or substantially parallel to the direction A, rotatably mounted in it by way of substantially horizontally aligned ball bearings 51 that are mounted in bearing housings carried by its front and rear walls. The shaft 50 has splined portions which project both forwardly in front of, and rearwardly behind, the front and rear walls of the further gear casing 47 and also a splined intermediate portion which is located internally of the casing 47. The splined intermediate portion co-operates with splines in the hub of a straight-toothed or spur-toothed pinion 49, the teeth of said pinion 49 being in driving mesh with those of the underlying and larger pinion 48. It will be apparent that, since the pinion 48 is larger in diameter than the pinion 49, the output shaft 44 of the further gear casing 47 will be rotated at a slower speed than will the input shaft 50 of the same casing 47 to produce a step-down transmission between the shafts 50 and 44.

The bottom of the frame portion 1 is closed at its opposite ends and said closed ends are provided with substantially vertically disposed support strips 52 that extend parallel to substantially parallel to the direction A, said strips 52 extending rearwardly as far as the rear limbs 2 of the frame portion 1. In addition, two further strips 52 are provided at regularly spaced apart intervals along the bottom of the frame portion 1. There is thus a total of four regularly spaced apart strips 52 and each such strip 52 has the leading end of a corresponding arm 53 pivotally connected to it at a location which is close to its rearmost end. It is noted that FIG. 3 of the drawings shows one of the strips 52 and the corresponding pivot point which has just been mentioned but omits the arm 53 concerned, reference being made, in this connection, principally to FIGS. 1 and 2 of the drawings. Rear regions of the arms 53, with respect to the direction A, carry horizontal bearings and three open-work ground rollers 54 that are in axial alignment with one another are freely rotatably mounted between the bearings carried by the four arms 53 so as to lie at the rear of the implement with respect to the direction A to cover substantially the same working width as the foregoing twelve soil working members 29. Each open-work ground roller 54 is of cage formation and comprises a plurality of regularly spaced apart circumferential elongate elements which are preferably, as illustrated, wound helically around the axis of rotation of the roller 54 concerned. The back of the frame portion 1, with respect to the direction A, is provided at its opposite ends with two upwardly projecting sector plates 55 each of which is formed with a curved row of holes 56 in which row each hole 56 is at the same distance from the axis about which the four arms 53 are turnable relative to the four strips 52. Each of the two arms 53 which is located at the opposite ends of the frame portion 1 carries an upright arm 58 formed with an opening at its upper end. The openings at the upper ends of the arms 58 can register with chosen ones of the holes 56 in the two sector plates 55 and retaining bolts 57 are provided for entry through said openings and chosen holes 56 to retain the arms 53, and thus the rollers 54, in chosen angular positions around the axis about which the arms 53 are turnable relative to the strips 52. In order manually to be able to turn the three rollers 54 upwardly and downwardly relative to the frame portion 1 without dificulty, each of the two arms 53 which is near the opposite ends of said frame portion 1 is provided with a corresponding socket 59 into which can be inserted one end of a lifting arm 60. The lifting arm 60 enables the required upward or downward manipulation readily to be made once the retaining bolts 57 have been removed and, when the required relative level of the frame portion 1 and the rollers 54 has been attained, it is only necessary to replace and tighten the bolts 57. It will be appreciated that the level of the axis of rotation of the three rollers 54 which is chosen relative to the le·..' of the frame portion 1 is a principal factor in determining the maximum depth of penetration of the tines 26 of the soil working members 29 into the soil which is possible when the implement is in use. The lifting arm 60 is preferably removed from the implement when it is not in use but, if preferred, two of the lifting arms 60 may be provided and may be rigidly secured to the corresponding sockets 59.

The aforementioned two brackets 30 are provided at the foot of a coupling member or trestle of the implement which coupling member or trestle is of generally triangular configuration as seen in front or rear elevation. The apex of the coupling member or trestle is provided with a plate 61 of which at least a central region is horizontally or substantially horizontally disposed. The plate 61 is formed with holes and the upper ends of two struts 62 (FIGS. 1 and 2) are releasably secured to the plate 61, employing those holes, the two struts 62 being downwardly and outwardly divergent away from the plate 61 but being so disposed that, as seen in the plan view of FIG. 1 of the drawings, they are in axial alignment with one another. The outer and lower ends of the two struts 62 are bolted to the front of the frame portion 1. Two further downwardly and rearwardly divergent struts 63 extend between a rear region of the plate 61 and horizontally spaced apart locations at the back of the frame portion 1, holes being formed in the plate 61 for the reception of bolts to effect the releasable connection of the upper ends of the struts 63 thereto.

In the use of the soil cultivating implement which has been described with reference to FIGS. 1 to 6 of the accompanying drawings, the coupling member or trestle which includes the brackets 30 is connected to the three-point lifting device or hitch at the rear of an agricultural tractor or other operating vehicle in a manner which is generally known per se and which is illustrated somewhat diagrammatically in FIGS. 1 and 2 of the drawings. The rear power take-off shaft of the agricultural tractor or other operating vehicle is placed in driving connection with the forwardly projecting splined end of the shaft 50 by way of an intermediate telescopic transmission shaft, which is of a construction that is known per se, having universal joints at its opposite ends. If required, the maximum depth to which the tines 26 of the soil working members 29 can penetrate into the ground is adjusted, before work commences, by moving the rollers 54 upwardly or downwardly relative to the frame portion 1 in the manner described above, using the retaining bolts 57 to maintain any new depth setting that may be so established for as long as may be required. This adjustment will usually be made having regard to the nature and condition of the soil that is to be dealt with and to the particular purpose for which that soil is required after cultivation. As the implement is moved forwardly in the direction A over land that is to be cultivated, the rotary drive that is imparted to the shaft 50 causes the twelve (in this embodiment) soil working members 29 to revolve around their vertical or substantially vertical axes of rotation in the directions which are indicated by small arrows in FIG. 1 of the drawings so that, as previously mentioned, each member 29 revolves in the opposite direction to the or each of its immediate neighbours. Each soil working member 29 has an effective working width which is a little greater than is the distance between the axes of rotation of neighbouring shafts 13 so that the twelve strips of land which are worked by the individual members 29 overlap one another to produce, in effect, a single broad strip of cultivated soil. Due to the fact that each carrier 20 is formed principally from the spring steel strips 23 and 24, the tines 26 of the various members 29 can deflect resiliently in the event that they should strike an embedded rock or other substantially immovable obstacle when the implement is in operation. This deflectability, against resilient opposition, of the tines 26 is an important factor in preventing them from becoming broken or seriously damaged by collisions with embedded rocks, large stones and other obstacles and, additionally, the resilient construction of the carriers 20 can enable the tines 26 to produce an improved, somewhat vibratory, effect upon the soil under some operating conditions, and particularly when the soil that is to be dealt with is "heavy" soil.

If required, the soil that is being cultivated by the members 59, and also by the following rollers 54 which have a lump-crushing and soil-levelling effect, may be sprayed with liquid from the nozzles or heads 34 which form parts of a spraying mechanism. Such liquid may, for example, be an aqueous solution or dispersion of at least one chemical designed to stimulate the growth of plants which are to be introduced into the cultivated soil and/or may comprise a herbicide and/or a pesticide. The sprayed material is rapidly incorporated into at least the top soil by the cultivating tines 26 whilst the nozzles or heads 34 are substantially prevented from becoming clogged by weed remnants and the like, which would interfere with their action, by the provision of the resilient tines 35, those tines urging potentially blocking material downwardly away from the nozzles or heads 34 so that the action of the latter is not interfered with. In addition, the resilient tines 35 cooperate to some extent with the members 29 in cultivating the soil.

The frame portion 1 that has been described above and that is illustrated in the drawings is made from a single sheet of metal (although it is within the scope of the invention to use a non-metallic material for this purpose) and can be brought to its final configuration in a relatively simple and inexpensive manner. The sheet steel gear casings 6 are individually installed, and are capable of ready individual removal, it only being necessary to install the coupling bolts 42, which are preferably shear bolts, to establish the driving connections between the shafts 36 and thus the drive to all of the soil working members 29. The particular advantage is obtained that, if any one soil working member 29 or gear casing 6 should have a part damaged or broken, that assembly 6/29 can quickly and easily be removed as a single unit and be replaced by an identical but fully operational unit. If the coupling bolts 42 are shear bolts, the drive connection to, for example, a jammed unit 6/29 will break so that the neighbouring unit or units will not be consequentially damaged, the broken shear bolts 42 being capable of being replaced quickly and at very low cost. It will be appreciated that, in contradistinction to known soil cultivating implements whose drive transmissions are contained wholly or principally inside a hollow frame portion or other gear casing, the breakage or damage of one unit 6/29 in an implement in accordance with the invention does not involve a major repair procedure but merely the replacement of the unit in question by an identical spare unit, only the release and reconnection of a few readily accessible bolts being necessary. This can quickly and easily be done in a farm workshop or even in the field provided only that the necessary spares are on hand.

FIG. 7 of the drawings illustrates a soil cultivating implement which is similar in many respects to the implement that has already been described with reference to FIGS. 1 to 6 and, accordingly, parts of the implement of FIG. 7 which are similar or identical to parts which have already been described with reference to the foregoing Figures are indicated in FIG. 7 by the same references as are used in FIGS. 1 to 6 and will not be described again in detail. The implement of FIG. 7 has a frame portion 64 of channel-shaped cross-section that extends substantially horizontally transverse and usually (as illustrated substantially horizontally perpendicular, to the direction A of FIGS. 1, 3 and 4 of the drawings. In this case, the web or base of the channel is lowermost, the limbs thereof projecting upwardly at the front and rear, with respect to the direction A, of said base. In this case, each soil working member 29 is connected to a non-horizontal, and usually vertical or substantially vertical, shaft 65 or 66 which embodies its axis of rotation. The shafts 65 and 66 extend upwardly through the base of the frame portion 64 between the limbs thereof and it will be noted from FIG. 7 of the drawings that said limbs are bevelled downwardly towards the web or base at the opposite ends of the frame portion 64 and that the two soil working members 29 which lie at the opposite ends of the single row of those members 29 are connected to shafts 65 while all of the intermediate soil working members 29 are connected to shafts 66, the shafts 66 being of greater axial length than are the two shafts 65. The portions of the shafts 65 and 66 which project upwardly between the limbs of the channel-shaped frame portion 64 are formed with axially extending keyways but could, as an alternative, be splined. Each pair of immediately neighbouring shafts 65, 66 or 66, 65 is drivingly interconnected by a unitary gear casing 67 in which is located four successively intermeshing straight toothed or spur-toothed pinions 68. A study of FIG. 7 of the drawings will show that each gear casing 67 is in the form of a cassette which has, towards its opposite ends, two vertical holes that register with the axes of rotation of the two toothed pinions 68 at the opposite ends of the corresponding row of four such pinions. Each "cassette" can be passed downwardly over the shafts 65, 66 or 66, 65 which it is drivingly to interconnect, each shaft 66 thus co-operating with two superposed cassettes while each shorter shaft 65 co-operates with only one of them. When, as is preferred, each shaft 65 and 66 has only a single keyway, the required angular positions of the tine carriers 20 about the axes of said shafts 65 and 66 are automatically produced whereas, if splines are employed, some care must be taken during assembly to ensure that the required angular positions are established. Bridges 70 interconnect the upper edges of the limbs of the frame portion 64 at regular intervals along those edges and manually tightenable clamping screws 69 co-operate with those bridges 70 in such a way that their lower ends (not visible) press the upper gear casings 67 (cassettes) downwardly towards the web or base of the frame portion 64 thus ensuring that none of said casings 67 can accidentally become detacted upwardly to interfere with the drive transmission to the members 29. It will be appreciated that any worn, broken or damaged gear casing (cassette) 67 can quickly and easily be removed and be replaced by an identical but fully operational spare. Similarly, should any shaft 65 or 66 and/or the corresponding soil working member 29 be worn, broken or damaged, it is only necessary to unbolt the flange at the upper end of the respective bearing housing 11 from the web or base of the frame portion 64 to enable the whole unit 29/65 or 29/66 to be readily removable and replaceable by a fully operational spare unit.

Although certain features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

I claim:

1. A soil cultivating implement comprising a frame and a plurality of soil working members being supported on a portion of said frame, driving means connected to rotate said members about respective upwardly extending axes and said driving means including transmission gear means for each of said members, each member comprising a unitary gear casing that is releasably fastened to said frame portion, said frame portion being elongated and extending transverse to the direction of travel, the casings of said members being mounted along the length of said frame portion, said frame portion being inverted channel-shaped in cross-section with an upper apertured base and spaced apart, downwardly extending limbs, said casings being positioned between the downwardly extending limbs, a top portion of each casing comprising an upwardly extending projection that is positioned in a corresponding hole of said base of the frame portion.

2. A soil cultivating implement as claimed in claim 1, wherein said casing is formed from deep-drawn sheet steel and bevel pinions with shafts are housed in corresponding casings.

3. An implement as claimed in claim 1, wherein said projection is circular in shape.

4. An implement as claimed in claim 3, wherein said projection has a screwthreaded filler opening and a screwthreaded plug is fitted in said opening.

5. An implement as claimed in claim 1, wherein gear parts of said transmission gear means are housed in said casings, each casing being formed from sheet metal material and having an octagonal cross-section.

6. An implement as claimed in claim 5, wherein said parts comprise intermeshing bevel pinions on successive soil working members, each soil working member being connected to revolve in the opposite direction relative to neighboring member.

7. An implement as claimed in claim 6, wherein said casing rotatably supports a corresponding substantially horizontal shaft of said transmission means and successively neighboring shafts being releasably connected to one another to drive said members.

8. An implement as claimed in claim 7, wherein each releasable connection comprises at least one shear fastening, whereby upon overload one shaft can rotate relative to the other shaft.

9. An implement as claimed in claim 8, wherein the driving connection between the shafts is established by said shear fastening and the latter clamps coupling flanges of said members to one another.

10. A soil cultivating implement comprising a frame and a plurality of soil working members being supported on a portion of said frame, driving means connected to rotate said members about respective upwardly extending axes and said driving means including transmission gear means for each of said members, each member comprising a unitary gear casing that is releasably fastened to said frame portion, said frame portion being channel-shaped and extending transverse to the direction of travel, the casings of said members being mounted along the length of said frame portion, said frame portion having an inverted U-shaped cross-section with an upper base and spaced apart, downwardly extending limbs, said casings being positioned between the downwardly extending limbs and having co-extending side walls adjacent said limbs, a top portion of each casing co-extending with said base and the center of the top portion being held in a hole formed in the base.

11. An implement as claimed in claim 10, wherein the frame portion and casing are formed from sheet metal parts that are each bent into matching U-shaped configurations.

* * * * *